US012572431B2

(12) United States Patent
Huang et al.

(10) Patent No.: US 12,572,431 B2
(45) Date of Patent: Mar. 10, 2026

(54) METHOD, DEVICE, AND PRODUCT FOR SELECTING INPUT OUTPUT ARRAY

(71) Applicant: Dell Products L.P., Round Rock, TX (US)

(72) Inventors: Jack Huang, Chengdu (CN); Jiayi Chen, Chengdu (CN); Jie Zhao, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 45 days.

(21) Appl. No.: 18/601,022

(22) Filed: Mar. 11, 2024

(65) Prior Publication Data

US 2025/0077364 A1     Mar. 6, 2025

(30) Foreign Application Priority Data

Aug. 31, 2023     (CN) .......................... 202311121939.9

(51) Int. Cl.
| | |
|---|---|
| *G06F 11/00* | (2006.01) |
| *G06F 11/07* | (2006.01) |
| *G06F 11/16* | (2006.01) |
| *G06F 11/30* | (2006.01) |

(52) U.S. Cl.
CPC ...... *G06F 11/1658* (2013.01); *G06F 11/0772* (2013.01); *G06F 11/3034* (2013.01)

(58) Field of Classification Search
None
See application file for complete search history.

(56) References Cited

U.S. PATENT DOCUMENTS

| | | | |
|---|---|---|---|
| 7,711,711 B1 | 5/2010 | Linnell et al. | |
| 7,721,144 B2 | 5/2010 | Brown et al. | |
| 10,552,072 B1 | 2/2020 | Bono et al. | |
| 10,909,001 B1 * | 2/2021 | Kucherov | G06F 11/1458 |
| 11,281,541 B2 | 3/2022 | Jin et al. | |
| 11,347,607 B1 | 5/2022 | Tylik et al. | |
| 11,556,441 B2 | 1/2023 | Tylik et al. | |
| 2004/0078644 A1 * | 4/2004 | Fujibayashi | G06F 11/0757 |
| | | | 714/E11.003 |
| 2009/0271589 A1 | 10/2009 | Karpoff et al. | |

(Continued)

OTHER PUBLICATIONS

Google Scholar/Patents search—text refined (Year: 2025).*

*Primary Examiner* — Christopher S Mccarthy
(74) *Attorney, Agent, or Firm* — BainwoodHuang

(57) ABSTRACT

Techniques for selecting an input/output (IO) array from storage arrays involve acquiring groups of volume states of a target volume of volumes in the storage arrays, wherein each of the groups of volume states includes volume states at different time points. Such techniques further involve determining, based on the groups of volume states, pieces of state change information of the target volume in the storage arrays. Such techniques further involve determining similarities among groups of array states of the storage arrays and similarity change information among the similarities, wherein an array state of each of the storage arrays is based on a volume state set of the volumes in each of the storage arrays. Such techniques further involve selecting, based on the similarity change information and the pieces of state change information corresponding to the storage arrays, an IO array from the storage arrays which is used for IO.

20 Claims, 7 Drawing Sheets

(56) References Cited

U.S. PATENT DOCUMENTS

| | | | | |
|---|---|---|---|---|
| 2010/0218039 | A1 | 8/2010 | Brown et al. | |
| 2010/0318756 | A1* | 12/2010 | Yoshinari | G06F 11/0775 |
| | | | | 711/E12.001 |
| 2011/0035430 | A1 | 2/2011 | Hayward | |
| 2020/0387430 | A1* | 12/2020 | Hironaka | G06F 11/1469 |

* cited by examiner

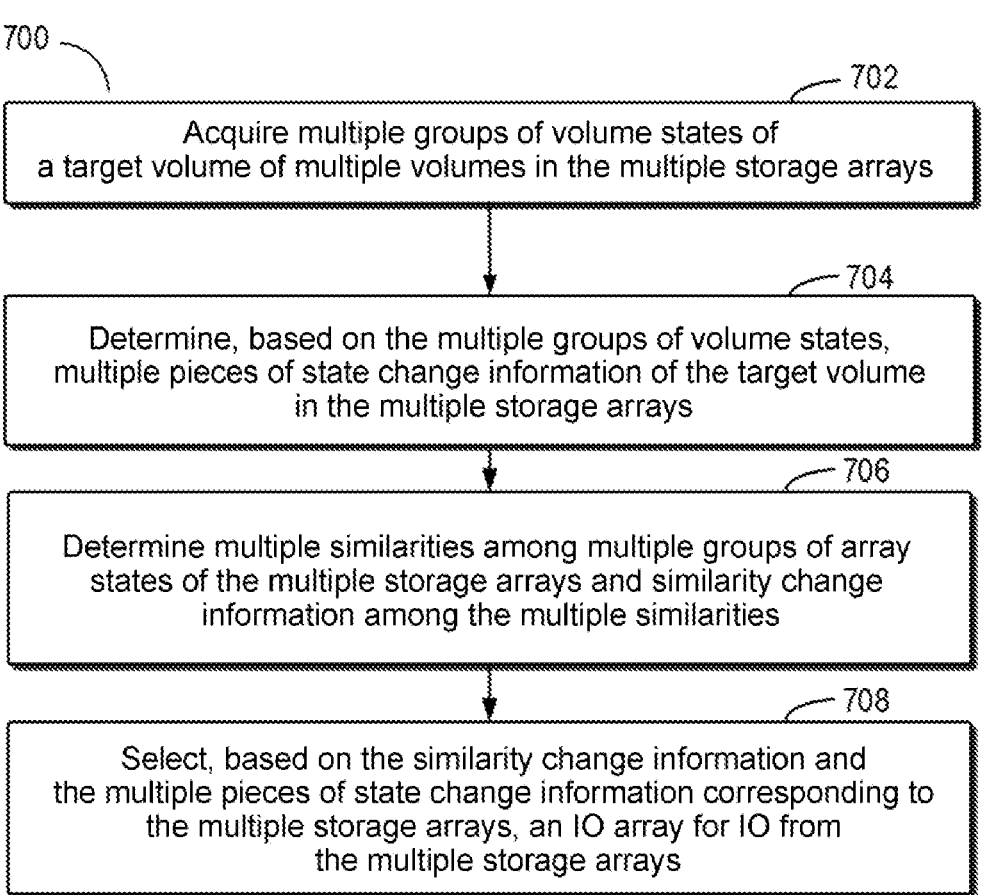

700

702
Acquire multiple groups of volume states of
a target volume of multiple volumes in the multiple storage arrays 704
Determine, based on the multiple groups of volume states,
multiple pieces of state change information of the target volume
in the multiple storage arrays 706
Determine multiple similarities among multiple groups of array
states of the multiple storage arrays and similarity change
information among the multiple similarities 708
Select, based on the similarity change information and
the multiple pieces of state change information corresponding to
the multiple storage arrays, an IO array for IO from
the multiple storage arrays

FIG. 7

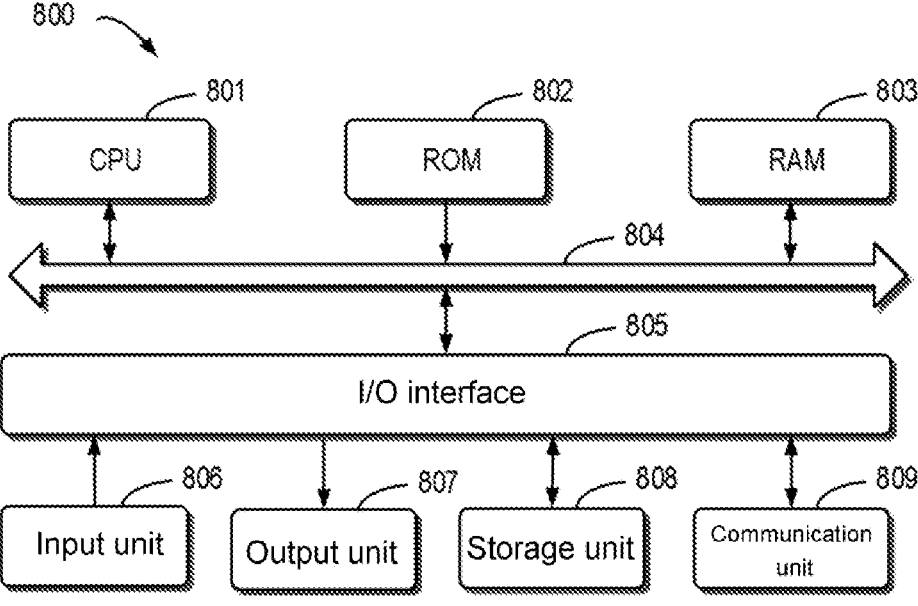

800

801 CPU

802 ROM

803 RAM

804

805
I/O interface

806 Input unit

807 Output unit

808 Storage unit

809 Communication unit

FIG. 8

METHOD, DEVICE, AND PRODUCT FOR SELECTING INPUT OUTPUT ARRAY

CROSS-REFERENCE TO RELATED APPLICATION

This application claims priority to Chinese Patent Application No. CN202311121939.9, on file at the China National Intellectual Property Administration (CNIPA), having a filing date of Aug. 31, 2023, and having "METHODS, ELECTRONIC DEVICES, COMPUTER PROGRAM PRODUCTS FOR SELECTING AN INPUT OUTPUT (IO) ARRAY FROM A PLURALITY OF STORAGE ARRAYS" as a title, the contents and teachings of which are herein incorporated by reference in their entirety.

TECHNICAL FIELD

Embodiments of the present disclosure relate to the field of computer technologies, and more specifically, to a method, a device, and a product for selecting an input/output (IO) array.

BACKGROUND

In a data replication and backup system, multiple storage arrays are usually provided, and data is stored separately in these multiple storage arrays to avoid input/output (IO) issues for user devices in the event of partial storage array failures. Sometimes, there is a replication link between the multiple storage arrays for replicating data, so that when data updates occur in a storage array, the updated content can be synchronized to all storage arrays.

In this case, once the replication link between the storage arrays fails, only the selected storage array will continue to provide IO services for users, while the unselected storage array will be moved offline. To ensure that there are no IO errors, the system needs to constantly switch between IO arrays currently providing IO. Therefore, the current data replication and backup system cannot provide good performance and high availability.

SUMMARY OF THE INVENTION

According to example embodiments of the present disclosure, a technical solution for selecting an input/output (IO) array is provided. An IO array for IO can be selected based on state change information of volume dimension and similarity change information of storage array dimension, so as to judge dynamically at a volume level whether the storage array is suitable for IO, which is more flexible and accurate, thus providing good performance and high availability.

In a first aspect of the present disclosure, a method for backup is provided. The method may include acquiring multiple groups of volume states of a target volume of multiple volumes in the multiple storage arrays, where each of the groups of volume states include multiple volume states at different time points. The method further includes determining, based on the multiple groups of volume states, multiple pieces of state change information of the target volume in the multiple storage arrays. The method further includes determining multiple similarities among multiple groups of array states of the multiple storage arrays and similarity change information among the multiple similarities, where an array state of each of the storage arrays is based on a volume state set of the multiple volumes in each of the storage arrays. Then, the method may include selecting, based on the similarity change information and the multiple pieces of state change information corresponding to the multiple storage arrays, an IO array from the multiple storage arrays which is used for IO.

In a second aspect of the present disclosure, an electronic device is provided. The electronic device includes: a processor; and a memory coupled to the processor and having instructions stored therein, where the instructions, when executed by the electronic device, cause the electronic device to perform operations including: acquiring multiple groups of volume states of a target volume of multiple volumes in the multiple storage arrays, where each of the groups of volume states include multiple volume states at different time points. The operations may further include determining, based on the multiple groups of volume states, multiple pieces of state change information of the target volume in the multiple storage arrays, and determining multiple similarities among multiple groups of array states of the multiple storage arrays and similarity change information among the multiple similarities, where an array state of each of the storage arrays is based on a volume state set of the multiple volumes in each of the storage arrays. The operations may further include selecting, based on the similarity change information and the multiple pieces of state change information corresponding to the multiple storage arrays, an IO array from the multiple storage arrays which is used for IO.

In a third aspect of the present disclosure, a computer program product is provided. The computer program product is tangibly stored in a computer-readable medium and includes computer-executable instructions, wherein the computer-executable instructions, when executed, cause a computer to perform the method according to the first aspect of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which:

FIG. 7 shows a flow chart of selecting an IO array according to some embodiments of the present disclosure; and FIG. 8 shows a schematic structural diagram of a device that can be configured to implement embodiments of the present disclosure.

DETAILED DESCRIPTION

Figure 1:
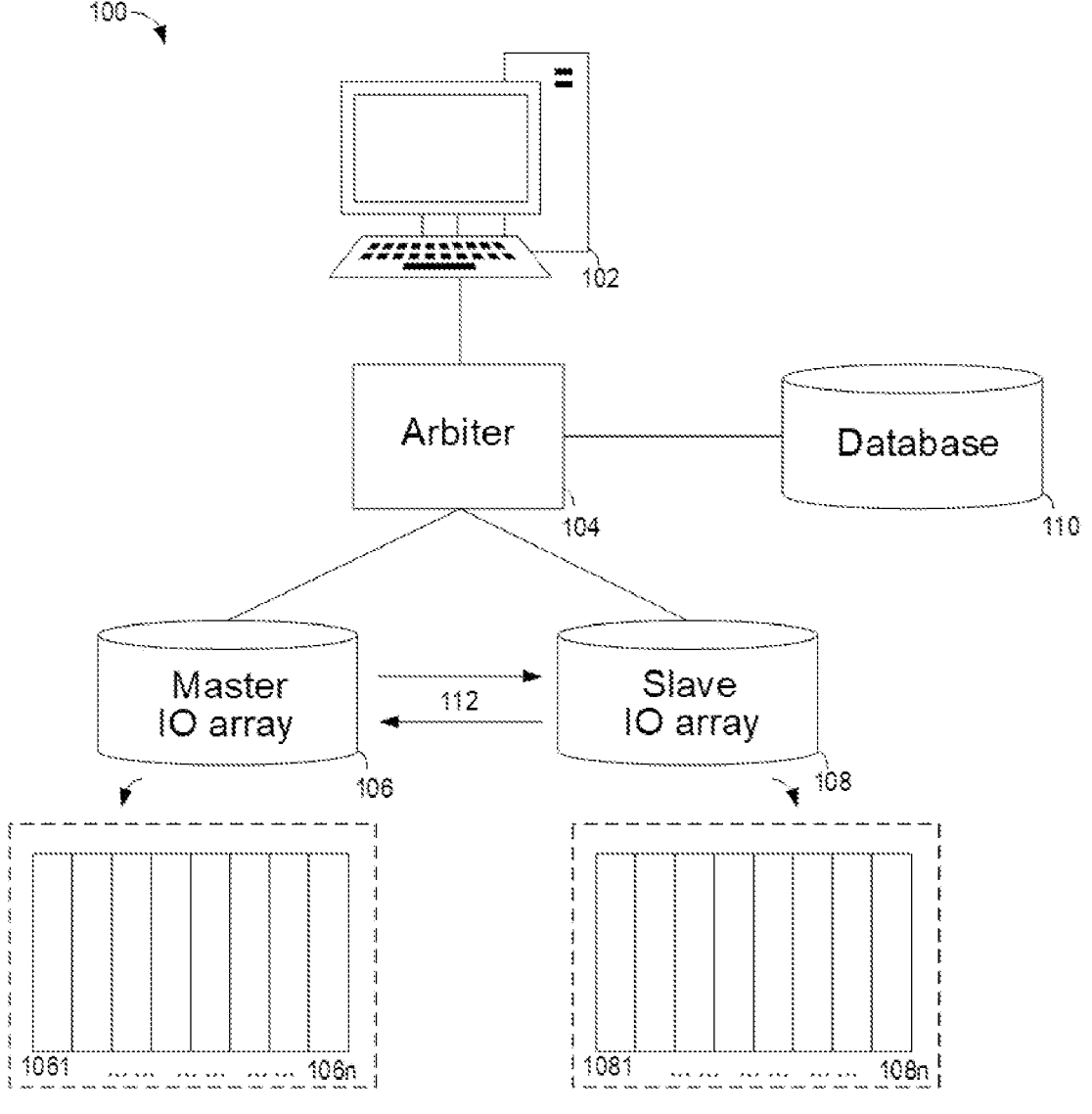
FIG. 1 shows an architecture diagram of a data replication and backup system according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The following will describe the embodiments of the present disclosure in more detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

At present, when switching is performed on a data replication and backup system, it is usually necessary to select an IO array currently serving a user based on predefined switching logic, and changes in the switching logic can only be manually operated by users. In addition, the switching logic can only serve IO by setting switching logic on all volumes of a storage array through user pre-configuration or static system configuration. If any failure occurs, it means that the current performance indicators or failure severity level of the data replication and backup system will not be considered, so the current data replication and backup system cannot provide better performance and high availability.

The present disclosure proposes a method, a device, and a product for selecting an IO array from multiple storage arrays. The method includes acquiring multiple groups of volume states of a target volume of multiple volumes in the multiple storage arrays, where each of the groups of volume states include multiple volume states at different time points. The method further includes determining, based on the multiple groups of volume states, multiple pieces of state change information of the target volume in the multiple storage arrays. The method further includes determining multiple similarities among multiple groups of array states of the multiple storage arrays and similarity change information among the multiple similarities, where an array state of each of the storage arrays is based on a volume state set of the multiple volumes in each of the storage arrays; and selecting, based on the similarity change information and the multiple pieces of state change information corresponding to the multiple storage arrays, an IO array from the multiple storage arrays which is used for IO. According to solutions of the embodiments of the present disclosure, an IO array for IO can be selected based on state change information of volume dimension and similarity change information of storage array dimension, so as to judge dynamically at a volume level whether the storage array is suitable for IO, which is more flexible and accurate, thus providing better performance and high availability.

The method proposed by the present disclosure is illustrated below with reference to FIG. 1. FIG. 1 shows a data replication and backup system 100 that can be used to implement the method provided by the present disclosure. The data replication and backup system 100 includes a user device 102, an arbiter 104, a master IO array 106, a slave IO array 108, and a database 110. The user device 102 may communicate with the master IO array 106 and the slave IO array 108 by means of the arbiter 104, and there is a replication link 112 for replicating data between the master IO array 106 and the slave IO array 108. In some embodiments, the system 100 can be a form of an Active-Active storage array. The master IO array 106 can be a local storage array, the slave IO array 108 can be a remote storage array, and both of the two storage arrays can serve the IO. In the master IO array 106 and the slave IO array 108, there are respectively volumes 1061-106$n$ and 1081-108$n$, where each pair of volumes with the same tail number is used to store the same data. Therefore, volumes with the same tail number can be considered as an entity of the volume with that tail number (also referred to as the number) in different storage arrays, used to store the content associated with each number/tail number. For example, a volume 1061 and a volume 1081 can be used to store the same data. The volume 1061 and the volume 1081 can be considered as entities of volumes with the number 1 respectively in the master IO array 106 and the slave IO array 108, used to store content associated with the number 1. The arbiter 104 is used to select, from volumes 1061-106$n$ and 1081-108$n$, volumes with each number/tail number that provide IO for the user device 102 (volumes providing IO can also be called offsets), so as to provide data associated with each number/tail number (for example, selecting, from volumes 1061 and 1081, volumes used to provide data associated with the number 1, and selecting, from volumes 1062 and 1082, volumes used to provide data associated with the number 2).

To select a target IO array for IO from the master IO array 106 and the slave IO array 108, the arbiter 104 can acquire, from the database 110, information for selecting the target IO array, for example, as described below, in a time window, change information (which can be also referred to as similarity change information) among similarities between array states of the storage arrays and the like.

The user device 102 can be one of various devices such as desktop computers, laptops, tablets, smartphones, wearable devices, etc. It can be understood that although FIG. 1 only shows two storage arrays 106 and 108, in other embodiments, the data replication and backup system 100 may include more than two storage arrays, for example, may include three, four, or other numbers of multiple storage arrays. The two storage arrays 106 and 108 shown in FIG. 1 are for the convenience of explanation and understanding in the following text, and the number of storage arrays should not be used as a limitation to the present disclosure. In addition, although the arbiter 104 in FIG. 1 is shown as an independent module connected between the user device 102 and the storage arrays 106 and 108, it cannot be used as a limitation to the present disclosure. For example, the arbiter 104 can be integrated in the user device 102, integrated in the storage array, or the like.

Figure 2:
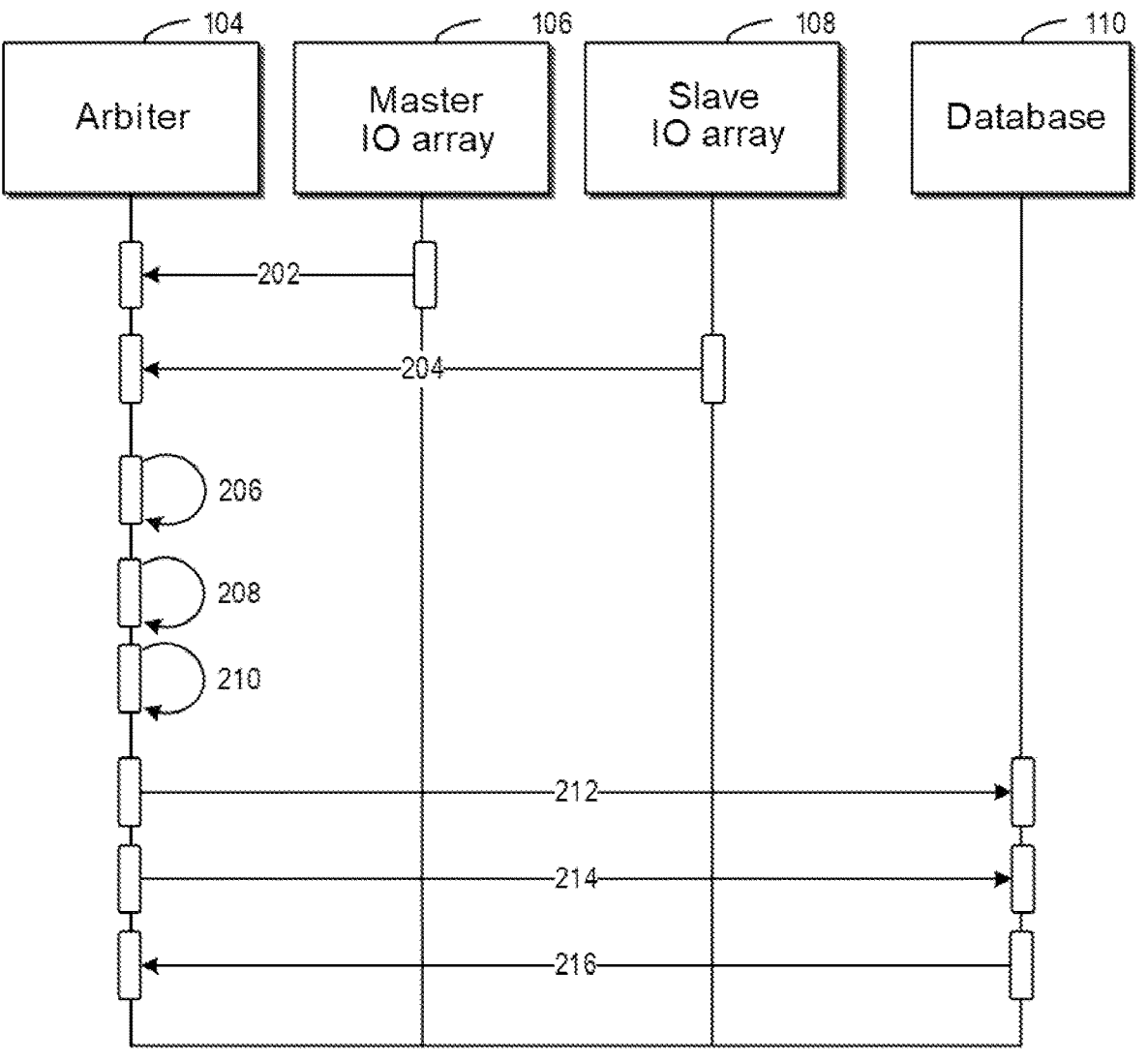
FIG. 2 shows a working timing diagram of a data replication and backup system according to some embodiments of the present disclosure.

For ease of understanding, the selection of the target IO array is explained by combining FIG. 1 and the action sequence in Timing FIG. 2. When the data replication and backup system 100 is working (for example, after initialization), the arbiter 104 can collect 202 (for example, collect periodically) volume states of volumes 1061-106*n* in the master IO array 106 over time and collect 204 volume states of volumes 1081-108*n* in the slave IO array 108 over time. It can be understood that the sequence of actions 202 and 204 is not restricted. The volume state only needs to be able to represent an operation state of the volume. For example, in some embodiments, the volume state may include processing resource utilization, capacity utilization, network port utilization, object scale numbers, system-related alerts and volume-related alerts, input/output operations per second (IOPS) of the volume, volume bandwidths, volume latency and/or volume queue depths of a corresponding volume in the storage array.

During collection, the arbiter 104 can judge whether enough samples have been collected in a window. For example, the arbiter 104 can judge whether the number of collected volume states for each volume has met a preset number condition. In some embodiments, the preset number condition can refer to that the number of collected volume states has reached a preset number threshold. If yes, the arbiter 104 can arrange 206 all the samples (i.e., samples of all volumes in the storage array at each time point, which can also be referred to as volume state sets) collected at each time point for each of the storage arrays in the window in an order of collection time as an overall state sequence (which can also be referred to as an array state of each of the storage arrays) of all volumes in each of the storage arrays. Meanwhile, the arbiter 104 can also arrange the samples (which can also be referred to as a group of volume states or a volume state group) collected by each volume in each of the storage arrays in the window at this time in an order of collection time into a single volume state sequence for each volume in each of the storage arrays to evaluate an individual operation state of each volume in each of the storage arrays. Alternatively, the arbiter 104 can also separately filter out the samples collected by each volume in each of the storage arrays in the window in the future to evaluate an individual operation state of each volume in each of the storage arrays.

For example, in some embodiments, when the number of volume states of volumes 1061-106*n* and 1081-108*n* in the window has met a preset number condition, all volume states (i.e., the volume state set) of volumes 1061-106*n* at each time point are arranged as an overall state sequence of the master IO array 106 in chronological order. All volume states (i.e., the volume state set) of volumes 1081-108*n* at each time point are arranged as an overall state sequence of the slave IO array 108 in chronological order. These overall state sequences can be used to represent an overall operation condition of the storage arrays. Meanwhile, the arbiter 104 can also arrange the samples collected by each volume of the volumes 1061-106*n* in the master IO array 106 in the window in an order of collection time into a single volume state sequence for each volume in the master IO array 106 at this time, and arrange the samples collected by each volume of volumes 1081-108*n* in the slave IO array 108 in the window in an order of collection time into a single volume state sequence for each volume in the slave IO array 108 at this time, so as to evaluate an individual operation state of each volume in each of the storage arrays. Alternatively, the arbiter 104 can also perform subsequent operations to obtain a single volume state sequence. In some embodiments, the obtained sequence may refer to a state vector obtained by arranging the volume states (or set) after vectorizing them.

Subsequently, the arbiter 104 can calculate 208 a change condition in similarities between the overall state sequence of the master IO array 106 and the volume state set in the overall state sequence of the slave IO array 108 at different time points, so as to evaluate the operation conditions of the master IO array 106 and the slave IO array 108. In some embodiments, the overall state sequence of the master IO array 106 and the volume state set in the overall state sequence of the slave IO array 108 can be grouped by time points, then volume state set pairs at N time points are selected therefrom, and similarity calculation is performed, so as to determine the change condition of similarities based on the calculated similarity. For example, in some embodiments, the arbiter 104 can select the volume state set pairs at the start and end time points from the overall state sequence of the master IO array 106 and the overall state sequence of the slave IO array 108, calculate a similarity between the volume state set pairs at the start time point and a similarity between the volume state set pairs at the end time points, and use a magnitude relationship between the two similarities as a similarity change condition.

Figure 3:
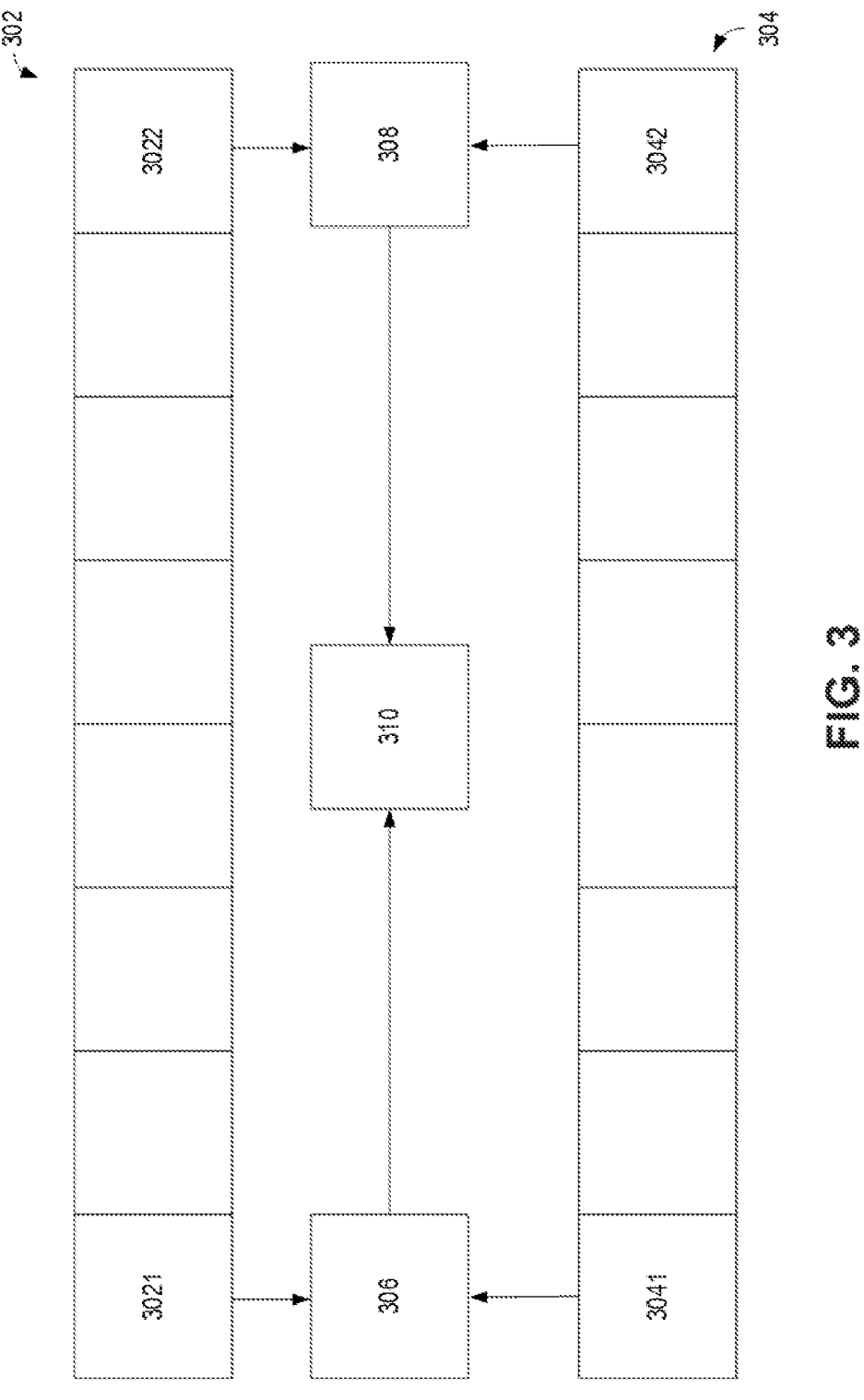
FIG. 3 shows a schematic diagram of obtaining a similarity change state according to some embodiments of the present disclosure.

For ease of understanding, please refer to FIG. 3 for an illustrative example. Assuming an overall state sequence 302 of the master IO array 106 and an overall state sequence 304 of the slave IO array 108 between 14:00 and 14:02 are obtained, at this time, a volume state set 3021 of volumes 1061-106*n* from the overall state sequence 302 at 14:00 and a volume state set 3041 of volumes 1081-108*n* in the overall state sequence 304 at 14:00 can be selected. A volume state set 3022 of volumes 1061-106*n* and a volume state set 3042 of volumes 1081-108*n* in the overall state sequence 304 at 14:05 can be selected. Then, the arbiter 104 calculates a similarity 306 between the volume state set 3021 and the volume state set 3041 and a similarity 308 between the volume state set 3022 and the volume state set 3042, and finally uses a magnitude relationship 310 between the similarity 306 and the similarity 308 as a similarity change condition. In some embodiments, similarities between the volume state sets can be obtained based on a distance between volumes with paired tail numbers. At this time, the similarities at each time point can be obtained by calculation based on formula (1):

$$d(x, y) = \sqrt{\sum_{i=1}^{n} (x_i - y_i)^2}. \qquad \text{Formula (1)}$$

where xi may refer to a volume state of the ith volume in the volume state set of the master IO array 106 at a corresponding time point, yi may refer to a volume state of the ith volume in the volume state set of the slave IO array 108 at a corresponding time point, n is the number of volumes in the storage array, and d(x,y) may refer to a similarity of volume state sets at a corresponding time point. For example, in some embodiments, when the time point is 14:00, xi ma refer to a volume state of the ith volume in a volume state set of the master IO array 106 at 14:00, yi may refer to a volume state of the ith volume in a volume state set of the slave IO array 108 at 14:00, and d(x,y) may refer to a similarity of the volume state sets at 14:00. It should be noted that although the example of selecting volume state sets at N time points has been explained in the previous text, it is also possible not to select, but instead, determine the similarity change condition based on volume state set pairs at all time points.

In addition, the arbiter 104 may further determine 210 individual operation states of each volume in the master IO array 106 and the slave IO array 108, so as to help select a suitable target IO array. In some embodiments, the individual operation states may include a change trend and a distribution deviation of volume states of the volumes in a window, where the distribution deviation may indicate a deviation degree of the volume state of the volume. The deviation degree can represent drastic changes in the volume during the window period, and the change trend can represent whether the volume state of the volume is stable.

In some embodiments, for each of the storage arrays, a distribution deviation of a volume state of each volume may be determined based on the formula (2) and the volume state of each volume at each time point:

$$D_M(x, y) = \sqrt{(x - y)^T \sum{}^{-1} (x - y)} \quad \text{Formula (2)}$$

where DM(x,y) may refer to the distribution deviation, x and y may refer to volume states in the volume state group of each volume, or where y may refer to a mean value of volume states in the group of volume states, and $\Sigma{-}1$ may refer to a covariance matrix of this group of volume states. For example, in some embodiments, all volume states in the volume state group of each volume in volumes 1061-106n and 1081-108n corresponding to the window 14:00 to 14:05 can be processed based on formula (2), so as to obtain the distribution deviation of the volume states of each volume in the volumes 1061-106n and 1081-108n.

In some embodiments, the change trend of each volume can be determined based on volume states of each volume at start and end time points in the window. For example, in some embodiments, the volume states at the start and end time points can be respectively processed by means of formula (3), and then the change trend may be determined based on a comparison result between processed data:

$$a \cdot b = (a^T) * b, \quad \text{formula (3)}$$

where a and b are volume states at corresponding time points. For example, in some embodiments, the arbiter 104 can use volume states of each volume among the volumes 1061-106n and 1081-108n at 14:00 in the master IO array 106 as a and b. Data 1 of each volume is obtained through calculation and processing using formula (3). The volume states at 14:05 are used as a and b. Data 2 of each volume is obtained through calculation and processing using formula (3). Volume states of each volume among the volumes 1061-106n and 1081-108n at 14:00 in the slave IO array 108 are used as a and b. Data 3 of each volume is obtained through calculation and processing using formula (3), volume states at 14:05 are used as a and b, and data 4 of each volume is obtained through calculation and processing using formula (3). Then, the arbiter 104 can compare differences between data 2 (for example, data obtained by processing the volume state of the volume 1061 in the master IO array 106 at 14:05) and data 1 (for example, data obtained by processing the volume state of the volume 1061 in the master IO array 106 at 14:00) for each numbered volume (such as the volume numbered 1), so as to determine a change trend of the volume states in the master IO array 106 for each numbered volume during the window period; and compare differences between data 4 (for example, data obtained by processing the volume state of the volume 1081 in the slave IO array 108 at 14:05) and data 3 (for example, data obtained by processing the volume state of the volume 1081 in the slave IO array 108 at 14:00) for each numbered volume (such as the volume numbered 1), so as to determine a change trend of the volume states in the slave IO array 108 for each numbered volume during the window period. The change trend can represent the operation stability of the volumes in the storage array, so as to provide a basis for selecting the target IO array. Ater the similarity change information, the distribution deviation, and the change trend in the window are obtained, the arbiter 104 can store 212 the data associated with the window time into the database 110.

Figure 4:
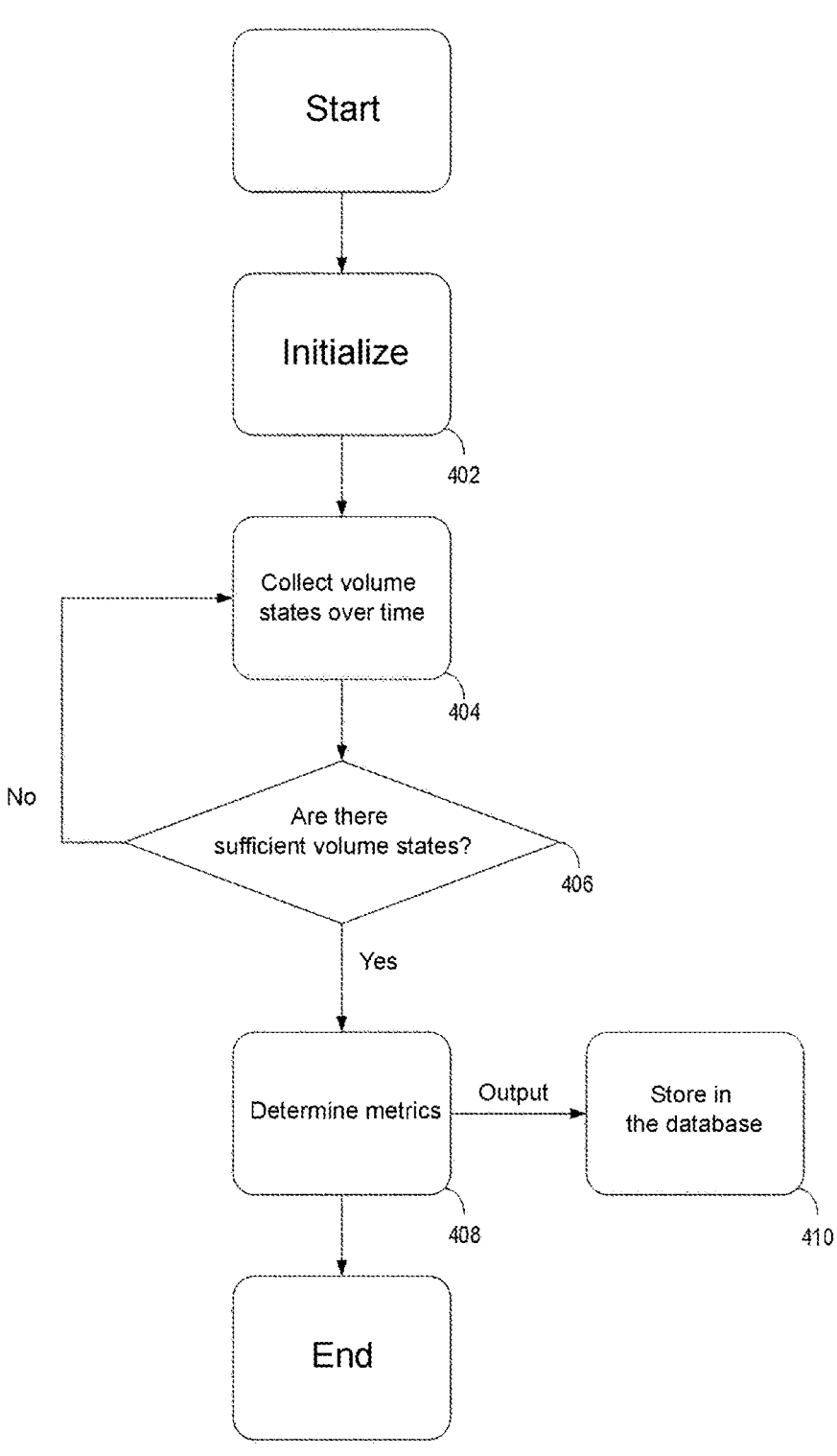
FIG. 4 shows a schematic flow chart of system work according to some embodiments of the present disclosure.

With reference to FIG. 4, FIG. 4 shows a schematic diagram of an example flow of the above process. At a block 402, the system 100 is initialized. Then, the process proceeds to a block 404. At the block 404, the arbiter 104 can collect volume states of volumes over time, and judges, at a block 406, whether sufficient volume states are collected. If yes, the process proceeds to a block 408. At the block 408, the arbiter 104 calculates similarity change information, a distribution deviation, and a change trend in the window based on the collected volume states, and stores the calculated metrics in the database 110 at a block 410. On the contrary, if sufficient volume states are not collected, the process returns to the block 404 and continues collecting until sufficient volume states are collected.

In some embodiments, when the system 100 has a failure (for example, when the replication link 112 between the master IO array 106 and the slave IO array 108 is interrupted), the arbiter 104 can send 214 a request to the database 110 based on the occurrence time of the failure. The database 110 sends 216 the similarity change information, the distribution deviation, and the change trend with the closest correlation time to the occurrence time of the failure to the arbiter 104. The arbiter 104 can judge the operation health of the master IO array 106 and the slave IO array 108 based on these metrics, so as to select suitable target IO arrays of each numbered volume therefrom. In some embodiments, the arbiter 104 can first determine a target IO array for IO based on manual settings when a failure occurs, and then dynamically switch the target IO array during interruption based on these metrics to avoid low performance and low availability caused by manually setting the target IO array.

In some embodiments, these metrics can be mapped to a predetermined state transition table, so as to select target IO arrays of each numbered volume. The state transition table includes a mapping relationship between various metrics and the selected target IO arrays. With reference to Table 1, Table 1 provides an example of a state transition table.

TABLE 1

| | | | State Transition Table | | |
|---|---|---|---|---|---|
| State | s_dev > e_dev | a1_dis > a2_dis | s_a1 > e_a1 | s_a2 > e_a2 | IO Array |
| 1 | Yes | No | Yes | Yes | 106 |
| 2 | Yes | No | Yes | No | 106 |
| 3 | Yes | No | No | Yes | 108 |
| 4 | Yes | No | No | No | 106 |
| 5 | Yes | Yes | Yes | Yes | 108 |
| 6 | Yes | Yes | Yes | No | 106 |
| 7 | Yes | Yes | No | Yes | 108 |
| 8 | Yes | Yes | No | No | 108 |
| 9 | No | No | Yes | Yes | 108 |
| 10 | No | No | Yes | No | 106 |
| 11 | No | No | No | Yes | 108 |
| 12 | No | No | No | No | 106 |
| 13 | No | Yes | Yes | Yes | 106 |
| 14 | No | Yes | Yes | No | 106 |
| 15 | No | Yes | No | Yes | 108 |
| 16 | No | Yes | No | No | 108 |

In some embodiments, s_dev is a similarity at a start time point, e_dev is a similarity at an end time point, a1_dis is a distribution deviation of the master IO array 106, a2_dis is a distribution deviation of the slave IO array 108. s_a1 is data obtained from processing the volume state of the master IO array 106 at the start time point based on the formula (3), e_a1 is data obtained from processing the volume state of the master IO array 106 at the end time point based on the formula (3), s_a2 is data obtained from processing the volume state of the slave IO array 108 at the start time point based on the formula (3), and e_a2 is data obtained from processing the volume state of the slave IO array 108 at the end time point based on the formula (3).

After these metrics are mapped to the state transition table to determine corresponding states, the storage array indicated by the state can be used as the target IO array for each numbered volume. For example, in some embodiments, for a volume numbered 1, if the determined state after mapping is 14 in Table 1, the master IO array 106 is used as the target IO array, i.e., the volume 1061 is used as a volume that is currently for IO of data associated with the number 1. For a volume numbered 2, if the determined state after mapping is 16 in Table 1, the slave IO array 108 is used as an IO array, i.e., the volume 1082 is used as a volume that is currently for IO of data corresponding to the number 2. After such processing, the system 100 can select a target IO array for IO based on state change information of the target volume dimension and similarity change information of the storage array dimension, so as to judge whether the storage array is suitable for IO of data corresponding to different numbers at the volume level and dynamically determine the same or different target IO arrays for each numbered volume, which is more flexible and accurate, thus providing good performance and high availability. For example, in some embodiments, the system 100 can set volumes 1061, 1082, 1083, 1064 . . . based on metrics to respectively provide IO for the user device 102.

Figure 5:
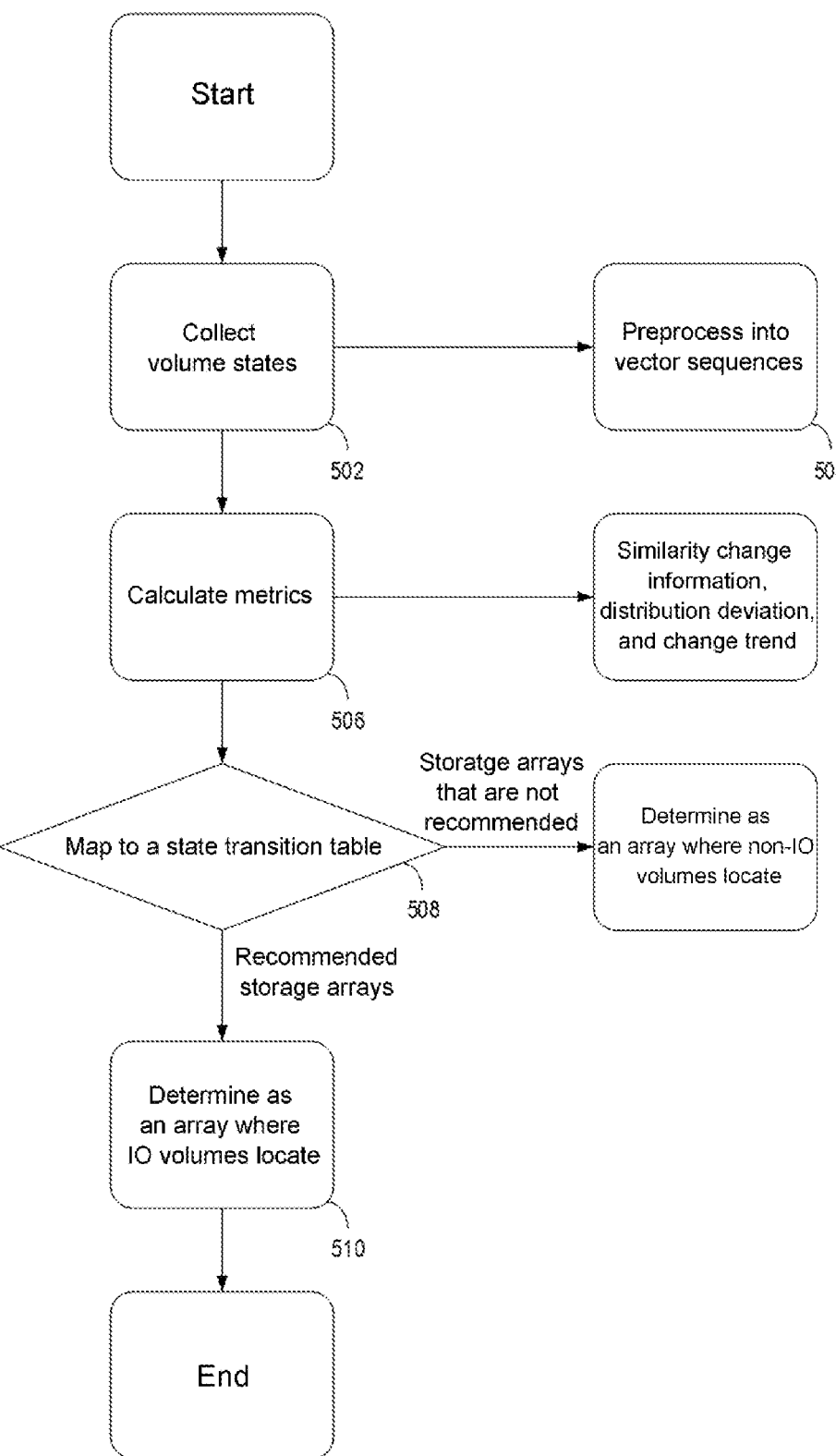
FIG. 5 shows another schematic flow chart of system work according to some embodiments of the present disclosure.

With reference to FIG. 5, FIG. 5 shows a schematic diagram of an example flow of the above process. At a block 502, the arbiter 104 collects volume states and preprocesses them at a block 504 as vector sequences. Then, the arbiter 104 obtains the various metrics by calculation using algorithms of formulas (1) to (3) at the block 506 based on the obtained vector sequences. These metrics obtained by calculation can be stored in the database 110 for subsequent use. When a target IO array needs to be selected, at a block 508, the arbiter 104 maps these metrics to the state transition table to determine states corresponding to each numbered volume, uses a storage array recommended by the state at a block 510 as a target IO array of each numbered volume, and uses a storage array that is not recommended/has not been recommended by the state as a non-IO array for each numbered volume. It should be noted that the condition for the process to reach the block 508 may not be limited to a failure of the system 100, but may also be the need for balancing loads between the master IO array 106 and the slave IO array 108, so as to balance the load based on a minimum state distance by selecting a suitable target IO array for each numbered volume.

It can be seen from the above description that according to solutions of the embodiments of the present disclosure, an IO array for IO can be selected based on state change information of the volume dimension and similarity change information of the storage array dimension, so as to dynamically judge whether the storage array is suitable for IO at the volume level, which is more flexible and accurate, thus providing good performance and high availability. It should be understood that the Summary of the Invention part is provided to introduce the selection of concepts in a simplified form, which will be further described in the Detailed Description below. The Summary of the Invention part is neither intended to recognize key features or main features of the present disclosure, nor intended to limit the scope of the present disclosure.

Figure 6A:
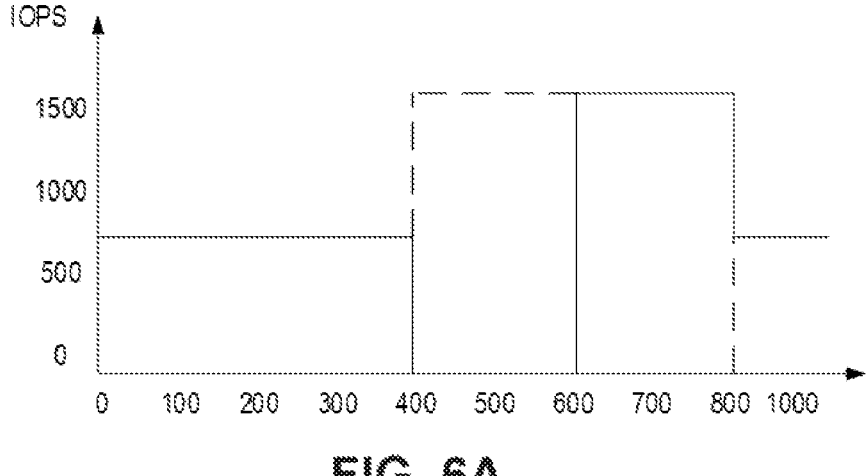
FIG. 6A and FIG. 6B show schematic diagrams of simulation results according to some embodiments of the present disclosure.
Figure 6B:
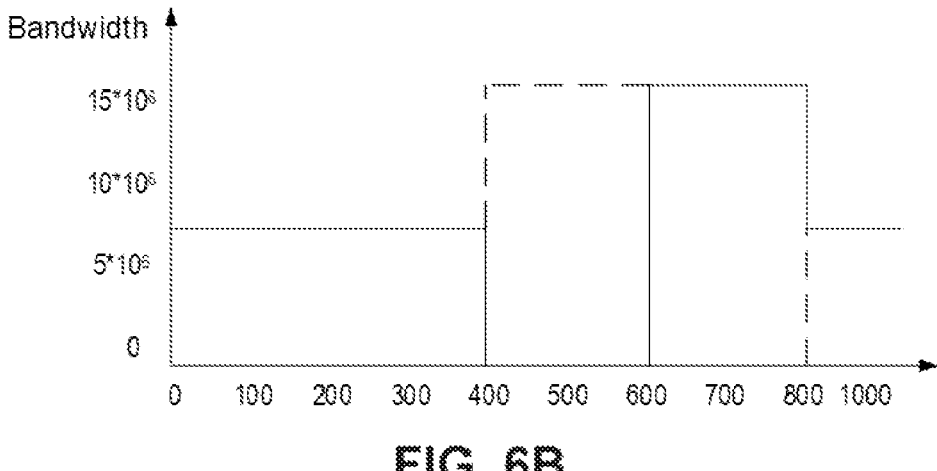

Taking the failure scenario as an example, with reference to FIG. 6A and FIG. 6B, FIG. 6A and FIG. 6B show the IOPS and bandwidth of simulation of the master IO array 106 and the slave IO array 108 when the IO arrays of the volumes with target numbers before and after selection are different, where solid lines represent the slave IO array 108, and the dashed line represent the master IO array 106. It should be noted that besides FIG. 6A and FIG. 6B, simulation results can also be represented by histograms for processing resource utilization, line charts for network port utilization, line charts for latency, and line charts for queue depth. FIG. 6A and FIG. 6B are for illustration purposes only. Moreover, in the simulation of load balancing, this method can also achieve the same effect as in the failure scenario.

Simulation interrupts the replication link 112 at the 400th sample point (time point). Assuming that the state transition table indicates that at this moment, the master IO array 106 is the IO array of the volume with the target number (or alternatively, it can be manually set to select the master IO array 106 when a failure occurs). Hence, at the 400th sample point, the master IO array 106 begins to provide IO for the data associated with the target number, and the IOPS and bandwidth of the master IO array 106 increase, while the slave IO array 108 no longer provides IO for the data associated with the target number, and the IOPS and bandwidth of the slave IO array 108 decrease. Assuming that the state transition table at the 600th sample point indicates that the slave IO array 108 is the IO array of the volume with the target number, it can be seen that the slave IO array 108 begins to provide IO for the data associated with the target number, and the IOPS and bandwidth of the slave IO array 108 begin to appear, while the master IO array 106 no longer provides IO for the data associated with the target number, and the IOPS and bandwidth of the master IO array 106 decrease. At the 800th sample point, simulation recovers the replication link 112, thus restoring to the situation before the interruption of the replication link 112, and the master IO array 106 and the slave IO array 108 continue to serve IO as before the interruption occurred. In the simulation, the volume size is 100 GB, and the IO mode is: random, 70% reading, IO size 8K, and the range of 50 volumes. The IO array manually set when the failure occurs is the master IO array 106. The IO hosts are in a uniform connection.

For case of understanding, with reference to FIG. 7, FIG. 7 provides a schematic flow chart of a method 700 for selecting an IO array from multiple storage arrays. It should be noted that the order of steps included in the method 700 cannot be used as a limitation to the method 700. For example, in some embodiments, an order between blocks 702-704 and 706 can be interchanged. At the block 702, multiple groups of volume states of a target volume in multiple volumes in multiple storage arrays are acquired, where each of the groups of volume states includes multiple volume states at different time points. For example, in some embodiments, a volume numbered 1 can be used as the target volume. Multiple volume states of the volume 1061 at different time points in the master IO array 106 are acquired, and multiple volume states of the volume 1081 at different time points in the slave IO array 108 are also acquired. In some embodiments, steps of the block 702 can be executed by the arbiter 104. In some embodiments, volume states of all the volumes in the master IO array 106 and the slave IO array 108 at different time points can be firstly acquired, so as to obtain volume state sets at different time points, and then volume states at different time points for each numbered volume are determined. Alternatively, volume states at different time points can be separately acquired for each numbered volume.

At the block 704, multiple pieces of state change information of the target volume in multiple storage arrays are determined based on multiple groups of volume states. For example, in some embodiments, when the volume numbered 1 is used as the target volume, distribution deviations of the volume 1061 and the volume 1081 and change trends of the volume 1061 and the volume 1081 can be determined based on formulas (2) and (3) in the above text and volume states of the volume 1061 and the volume 1081 at different time points in the master IO array 106 and the slave IO array 108. The distribution deviations and the change trends are used as the state change information. In some embodiments, the steps of the block 704 can be executed by the arbiter 104.

At the block 706, multiple similarities among multiple groups of array states of the multiple storage arrays and similarity change information among the multiple similarities are determined, where an array state of each of the storage arrays is based on a volume state set of the multiple volumes in each of the storage arrays. For example, in some embodiments, volume state sets of all volumes at different time points in the master IO array 106 and the slave IO array 108 described at the block 702 can be vectorized, and then arranged as array states of the master IO array 106 and the slave IO array 108 in chronological order. In some embodiments, the volume state sets in the array state can be grouped based on time, and then the similarity change information can be determined based on the similarity among the volume state sets in each group of the volume state sets. For example, in some embodiments, for the scenario of FIG. 1, volume state sets at start and end time points can be obtained by grouping, including the volume states of volumes 1061-

106n and volumes 1081-108n at the start time point and the volume states of volumes 1061-106n and volumes 1081-108n at the end time point. Then, a distance between volumes with paired tail numbers at the start time point and a distance between volumes with paired tail numbers at the end time point are determined, and the similarity between the volume state sets at the start time point and the end time point is determined based on the obtained distances. Finally, a magnitude relationship between similarities is determined as the similarity change information. In some embodiments, the steps of the block 706 can be executed by the arbiter 104.

At the block 708, based on the similarity change information and the multiple pieces of state change information corresponding to the multiple storage arrays, an IO array for IO is selected from the multiple storage arrays. In some embodiments, the similarity change information, a comparison result among multiple distribution deviations of the multiple storage arrays, and change trends of volumes in each of the storage arrays are mapped to a state transition table, so as to obtain an IO array indicated by the state transition table in the multiple storage arrays. For example, in some embodiments, these metrics can be mapped to the state transition table 1, so as to obtain an IO array indicated by the last column of Table 1. Assuming that the IO array indicated by the volume numbered 1 is the slave IO array 108, the current IO array can be switched from the master IO array 106 to the slave IO array 108; that is, the volume 1081 is used as a volume for IO, while the volume 1061 is no longer a volume for IO.

According to the above described embodiments of the present disclosure and their combined embodiments, good performance and high availability can be provided. It should be understood that the implementations shown in FIG. 1 to FIG. 7 above are only schematic. According to practical applications, the architecture or processes shown in FIG. 1 to FIG. 7 may have other different forms and may further include more or fewer one or more functional modules and/or units, and the modules and/or units may be partially or completely implemented as hardware modules, software modules, firmware modules, or any combination thereof, which is not limited in the embodiments of the present disclosure.

It can be understood that the specific names and/or protocols of the various components of the system described herein are intended only to help those skilled in the art better understand the ideas of the present disclosure and are not intended to limit the scope of the present disclosure in any way. Further, in other embodiments, more or better components may be included, and alternative components having the same or similar functions may also be included.

FIG. 8 shows a schematic structural diagram of an example device 800 that can be configured to implement some embodiments of the present disclosure. The device 800 may be implemented as a server or a PC. The embodiments of the present disclosure do not limit the specific implementation type of the device 800. As shown in FIG. 13, the device 800 includes a Central Processing Unit (CPU) 801, which may execute various appropriate actions and processing in accordance with computer program instructions stored in a Read-Only Memory (ROM) 802 or computer program instructions loaded onto a Random Access Memory (RAM) 803 from a storage unit 808. Various programs and data required for the operation of the device 800 may also be stored in the RAM 803. The CPU 801, the ROM 802, and the RAM 803 are connected to each other through a bus 804. An input/Output (I/O) interface 805 is also connected to the bus 804.

A plurality of components in the device 800 are connected to the I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The processing unit 801 may execute the various methods and/or processing described above, such as the method shown in FIG. 7. For example, in some embodiments, the method may be embodied as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded into the RAM 803 and executed by the CPU 801, one or more steps of the methods described above may be performed. Alternatively, in other embodiments, the CPU 801 may be configured to perform the method in any other suitable manners (e.g., by means of firmware).

The functions described herein above may be performed, at least in part, by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, micro-code, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the information of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter recited in the appended claims is not necessarily limited to the particular features or actions described above. Rather, the specific features and actions described above are merely example forms of implementing (or supporting) the claims.

The embodiments of the present disclosure have been described above. The foregoing description is illustrative rather than exhaustive, and is not limited to the embodiments disclosed. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for selecting an input/output (IO) array from multiple storage arrays, comprising:
acquiring multiple groups of volume states of a target volume of multiple volumes in the multiple storage arrays, wherein each of the groups of volume states comprises multiple volume states at different time points;
determining, based on the multiple groups of volume states, multiple pieces of state change information of the target volume in the multiple storage arrays;
determining multiple similarities among multiple groups of array states of the multiple storage arrays and similarity change information among the multiple similarities, wherein an array state of each of the storage arrays is based on a volume state set of the multiple volumes in each of the storage arrays; and
selecting, based on the similarity change information and the multiple pieces of state change information corresponding to the multiple storage arrays, an IO array from the multiple storage arrays which is used for IO;
wherein the multiple storage arrays include a first storage array and a second storage array which are constructed and arranged to replicate data with each other through a set of replication sessions;
wherein selecting the IO array includes designating the first storage array, rather than the second storage array, to process first IO requests for first data of the target volume during a failure of the set of replication sessions, the first data residing on both the first storage array and the second storage array; and
wherein the method further comprises:
after the first storage array has been designated to process the first IO requests, processing the first IO requests on the first storage array during the failure;
designating the second storage array, rather than the first storage array, to process second IO requests for second data of a second target volume during the failure, the second data residing on both the first storage array and the second storage array; and
after the second storage array has been designated to process the second IO requests, processing the second IO requests on the second storage array while the first IO requests are processed on the first storage array, thereby providing per-volume storage management during the failure.

2. The method according to claim 1, wherein each of the pieces of state change information comprises a distribution deviation and a change trend, and determining the multiple pieces of state change information of the target volume in the multiple storage arrays comprises:
for each of the multiple storage arrays, determining, based on a corresponding volume state in each of the groups of volume states at each time point, a distribution deviation of the target volume in each of the storage arrays, wherein the distribution deviation indicates a deviation degree of a volume state of the volume in each of the storage arrays;
determining volume states of the target volume in each of the storage arrays at start and end time points; and
determining, based on a difference between the volume states at start and end time points, a change trend of the target volume in each of the storage arrays.

3. The method according to claim 2, wherein selecting the IO array from the multiple storage arrays comprises:
mapping the similarity change information, a comparison result among multiple distribution deviations of the multiple storage arrays, and the change trend of the target volume in each of the storage arrays to a state transition table, so as to obtain the IO array from the multiple storage arrays which is indicated by the state transition table.

4. The method according to claim 1, further comprising:
collecting volume state sets of the multiple volumes in the multiple storage arrays over time; and
in response to that the number of volume state sets collected by each of the multiple storage arrays meets a preset number condition, arranging the volume state sets collected for each of the storage arrays as an array state of each of the storage arrays according to time points.

5. The method according to claim 4, wherein determining the multiple similarities among the multiple groups of array states of the multiple storage arrays and the similarity change information among the multiple similarities comprises:

grouping volume state sets of the multiple storage arrays at the same time point;

determining a similarity among the volume state sets in each group of volume state sets; and determining a magnitude relationship among the multiple similarities of the multiple groups of volume state sets as the similarity change information.

6. The method according to claim 1, wherein the method further comprises:

based on determining time of the similarity change information and the multiple pieces of state change information, storing the similarity change information and the multiple pieces of state change information in a database; and in response to that a system to which the multiple storage arrays belong has the failure, retrieving, from the database based on occurrence time of the failure, similarity change information and state change information for selecting the IO array.

7. The method according to claim 6, wherein the failure comprises interruption of a link for replicating data between the multiple storage arrays.

8. The method according to claim 1, wherein a volume state in a storage array comprises processing resource utilization, capacity utilization, network port utilization, object scale numbers, system-related alerts and volume-related alerts, input/output operations per second (IOPS) of the volume, volume bandwidths, volume latency, and/or volume queue depths of a corresponding volume in the storage array.

9. The method according to claim 1, further comprising:

for other volumes besides the target volume in the multiple volumes, respectively selecting corresponding IO arrays from the multiple storage arrays.

10. The method according to claim 1, wherein acquiring the multiple groups of volume states of the target volume includes:

sampling a first plurality of volume states for the target volume from the first storage array; and sampling a second plurality of volume states for the target volume from the second storage array, the first plurality of volume states and the second plurality of volume states indicating performance of the target volume during a shared time interval;

wherein determining the multiple pieces of state change information of the target volume includes:

generating, from the first plurality of volume states, a first change-trend indicator that represents a change in the first plurality of volume states across the shared time interval;

generating, from the second plurality of volume states, a second change-trend indicator that represents a change in the second plurality of volume states across the shared time interval; and wherein designating the first storage array to process the first IO requests is based on a comparison between the first change-trend indicator and the second change-trend indicator.

11. An electronic device, comprising:

a processor; and a memory coupled to the processor and having instructions stored therein, wherein the instructions, when executed by the processor, cause the electronic device to perform operations comprising:

acquiring multiple groups of volume states of a target volume of multiple volumes in multiple storage arrays, wherein each of the groups of volume states comprises multiple volume states at different time points;

determining, based on the multiple groups of volume states, multiple pieces of state change information of the target volume in the multiple storage arrays;

determining multiple similarities among multiple groups of array states of the multiple storage arrays and similarity change information among the multiple similarities, wherein an array state of each of the storage arrays is based on a volume state set of the multiple volumes in each of the storage arrays; and selecting, based on the similarity change information and the multiple pieces of state change information corresponding to the multiple storage arrays, an IO array for input/output (IO) from the multiple storage arrays;

wherein the multiple storage arrays include a first storage array and a second storage array which are constructed and arranged to replicate data with each other through a set of replication sessions;

wherein selecting the IO array includes designating the first storage array, rather than the second storage array, to process first IO requests for first data of the target volume during a failure of the set of replication sessions, the first data residing on both the first storage array and the second storage array; and wherein the method further comprises:

after the first storage array has been designated to process the first IO requests, processing the first IO requests on the first storage array during the failure;

designating the second storage array, rather than the first storage array, to process second IO requests for second data of a second target volume during the failure, the second data residing on both the first storage array and the second storage array; and after the second storage array has been designated to process the second IO requests, processing the second IO requests on the second storage array while the first IO requests are processed on the first storage array, thereby providing per-volume storage management during the failure.

12. The electronic device according to claim 11, wherein each of the pieces of state change information comprises a distribution deviation and a change trend, and determining the multiple pieces of state change information of the target volume in the multiple storage arrays comprises:

for each of the multiple storage arrays, determining, based on a corresponding volume state in each of the groups of volume states at each time point, a distribution deviation of the target volume in each of the storage arrays, wherein the distribution deviation indicates a deviation degree of a volume state of the volume in each of the storage arrays;

determining volume states of the target volume in each of the storage arrays at start and end time points; and determining, based on a difference between the volume states at start and end time points, a change trend of the target volume in each of the storage arrays.

13. The electronic device according to claim 12, wherein selecting the IO array from the multiple storage arrays comprises:

mapping the similarity change information, a comparison result among multiple distribution deviations of the multiple storage arrays, and the change trend of the target volume in each of the storage arrays to a state transition table, so as to obtain the IO array from the multiple storage arrays which is indicated by the state transition table.

14. The electronic device according to claim 11, wherein the operations further comprise:

collecting volume state sets of the multiple volumes in the multiple storage arrays over time; and in response to that the number of volume state sets collected by each of the multiple storage arrays meets a preset number condition, arranging the volume state sets collected for each of the storage arrays as an array state of each of the storage arrays according to time points.

15. The electronic device according to claim 14, wherein determining the multiple similarities among the multiple groups of array states of the multiple storage arrays and the similarity change information among the multiple similarities comprises:

grouping volume state sets of the multiple storage arrays at the same time point;

determining a similarity among the volume state sets in each group of volume state sets; and determining a magnitude relationship among the multiple similarities of the multiple groups of volume state sets as the similarity change information.

16. The electronic device according to claim 11, wherein the operations further comprise:

based on determining time of the similarity change information and the multiple pieces of state change information, storing the similarity change information and the multiple pieces of state change information in a database; and in response to that a system to which the multiple storage arrays belong has the failure, retrieving, from the database based on occurrence time of the failure, similarity change information and state change information for selecting the IO array.

17. The electronic device according to claim 11, wherein a volume state in a storage array comprises processing resource utilization, capacity utilization, network port utilization, object scale numbers, system-related alerts and volume-related alerts, input/output operations per second (IOPS) of the volume, volume bandwidths, volume latency, and/or volume queue depths of a corresponding volume in the storage array.

18. The electronic device according to claim 11, wherein the operations further comprise:

for other volumes besides the target volume in the multiple volumes, respectively selecting corresponding IO arrays from the multiple storage arrays.

19. A non-transitory computer program product that is tangibly stored on a computer-readable storage medium and comprises computer-executable instructions, wherein the computer-executable instructions, when executed, cause a computer to perform:

acquiring multiple groups of volume states of a target volume of multiple volumes in multiple storage arrays, wherein each of the groups of volume states comprises multiple volume states at different time points;

determining, based on the multiple groups of volume states, multiple pieces of state change information of the target volume in the multiple storage arrays;

determining multiple similarities among multiple groups of array states of the multiple storage arrays and similarity change information among the multiple similarities, wherein an array state of each of the storage arrays is based on a volume state set of the multiple volumes in each of the storage arrays; and selecting, based on the similarity change information and the multiple pieces of state change information corresponding to the multiple storage arrays, an IO array for input/output (IO) from the multiple storage arrays;

wherein the multiple storage arrays include a first storage array and a second storage array which are constructed and arranged to replicate data with each other through a set of replication sessions;

wherein selecting the IO array includes designating the first storage array, rather than the second storage array, to process first IO requests for first data of the target volume during a failure of the set of replication sessions, the first data residing on both the first storage array and the second storage array; and wherein the method further comprises:

after the first storage array has been designated to process the first IO requests, processing the first IO requests on the first storage array during the failure;

designating the second storage array, rather than the first storage array, to process second IO requests for second data of a second target volume during the failure, the second data residing on both the first storage array and the second storage array; and after the second storage array has been designated to process the second IO requests, processing the second IO requests on the second storage array while the first IO requests are processed on the first storage array, thereby providing per-volume storage management during the failure.

20. The non-transitory computer program product according to claim 19, wherein each of the pieces of state change information comprises a distribution deviation and a change trend, and determining the multiple pieces of state change information of the target volume in the multiple storage arrays comprises:

for each of the multiple storage arrays, determining, based on a corresponding volume state in each of the groups of volume states at each time point, a distribution deviation of the target volume in each of the storage arrays, wherein the distribution deviation indicates a deviation degree of a volume state of the volume in each of the storage arrays;

determining volume states of the target volume in each of the storage arrays at start and end time points; and determining, based on a difference between the volume states at start and end time points, a change trend of the target volume in each of the storage arrays.

* * * * *